Figure 1:
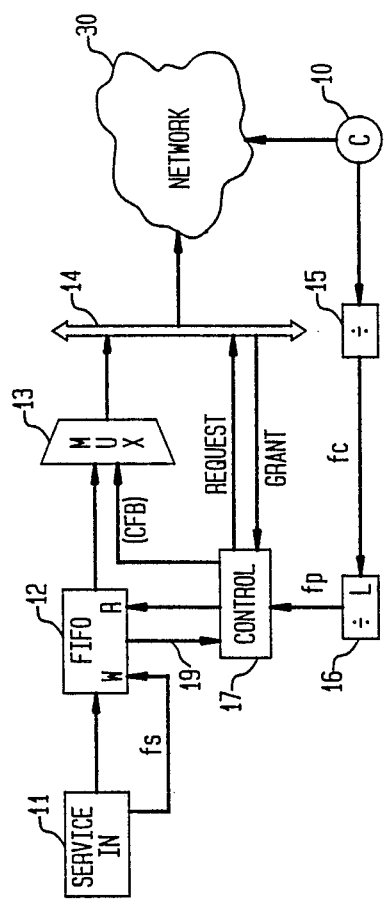

United States Patent [19]

Lau

[11] Patent Number: 4,961,188

[45] Date of Patent: Oct. 2, 1990

[54] SYNCHRONOUS FREQUENCY ENCODING TECHNIQUE FOR CLOCK TIMING RECOVERY IN A BROADBAND NETWORK

[75] Inventor: Chi-Leung Lau, Eatontown, N.J.

[73] Assignee: Bell Communications Research, Inc., Livingston, N.J.

[21] Appl. No.: 404,331

[22] Filed: Sep. 7, 1989

[51] Int. Cl.$^5$ .............................................. H04J 3/06
[52] U.S. Cl. .................................. 370/94.2; 370/94.1; 370/100.1
[58] Field of Search .................... 370/94.1, 94.2, 100.1, 370/105.3, 103

[56] References Cited

U.S. PATENT DOCUMENTS 4,530,091 7/1985 Crockett ........................ 370/103 X

FOREIGN PATENT DOCUMENTS 0094865 11/1983 France ............................... 370/44.2

OTHER PUBLICATIONS

"Adaptive Clock Synchronization Schemes for Real–Time Traffic in Broadband Packet Networks," R. P. Singh et al., 8th European Conference on Electrotechnics, Stockholm, Sweden, Jun. 1988.
"Jitter and Clock Recovery for Perodic Traffic in Broadband Packet Networks," R. P. Singh et al., IEEE Globecom '88, Florida, Dec. 1988.

Primary Examiner—Douglas W. Olms
Assistant Examiner—H. Kizou
Attorney, Agent, or Firm—James W. Falk; Lionel N. White

[57] ABSTRACT

A sychronous frequency encoding technique (SFET) provides method and apparatus for recovering the timing of an isochronous source node input service signal at the destination node of a synchronous ATM telecommunication network despite cell jitter which arises from the broadband multiplexing and switching delays in the network. A source node control clock is employed which is of greater frequency than that of the service signal and as a result a data under-flow condition occurs in the cell assembly process at a rate that is a function of the difference between such clock frequencies. Regular cell transmission is inhibited for a period at each under-flow occurrence and this pseudo-"stuffed cell" gap is signaled by setting a flag bit carried by an ensuing transmitted cell. At the destination node, a timing stream from the control clock, which is synchronous with that of the source node, is regularly gapped by inserting periods of delay according to the ratio of flagged cells in the service transmission, thereby reducing the timing stream by the noted frequency difference and reproducing the original service signal frequency.

15 Claims, 3 Drawing Sheets

# 4,961,188

SYNCHRONOUS FREQUENCY ENCODING TECHNIQUE FOR CLOCK TIMING RECOVERY IN A BROADBAND NETWORK

BACKGROUND OF THE INVENTION

The present invention provides a synchronous frequency encoding technique (SFET) for circuit emulation of real-time circuit-switched isochronous telecommunication services in a broadband asynchronous transfer mode (ATM) network. More particularly, the invention provides for recovery of a source node service clock frequency at the destination node in a synchronous network where the source and destination nodes are controlled by timing signals derived from a single master clock.

It is essential to the proper delivery of isochronous service traffic in a broadband network that the clock controlling the destination node buffer be operating at a frequency precisely matched to that of the service signal input at the source node in order to avoid loss of information due to buffer over-or under-flow. However, unlike the circuit-switched transport of service data wherein the clock frequency at the destination node may be traced directly back to that of the source node by the regular, periodic arrival of the isochronous traffic, transport in an ATM network inherently results in cell jitter, i.e. the random delay and aperiodic arrival of cells at a destination node, which essentially destroys the value of cell arrival instances as a means for directly recovering the original service signal input frequency.

Such cell jitter, generally the result of the multiplexing of transport cells in the broadband network and the cell queuing delays incurred at the ATM switches in the network, is substantially unpredictable. Thus, little is known of the statistics of cell arrival time beyond the fact that the average cell delay is a constant, assuming that the ATM network provides sufficient bandwidth to ensure against loss of cells within the network. As a means for closely approximating service signal frequency at the destination node, some consideration had previously been given to utilizing a direct extension of circuit-switched timing recovery practices which rely entirely upon a buffer fill signal as the basis for recovery of the source timing. However, due to the lack of knowledge of statistics of the cell jitter, this approach would have required a phase-locked loop with very low cut-off frequency (in the order of a few Hz) and would thus have resulted in excessive converging time and degradation of jitter and wander performance.

A number of schemes have more recently been proposed to improve upon such a conventional manner of recovering service timing in the presence of cell jitter, yet none has achieved this end economically and without extensive control systems of notable complexity. Singh et al., for example, in "Adaptive Clock Synchronization Schemes For Real-Time Traffic In Broadband Packet Networks," 8th European Conference on Electrotechnics, Stockholm, Sweden, June 1988, and "Jitter And Clock Recovery For Periodic Traffic In Broadband Packet Networks," IEEE Globecom '88, Florida, December 1988, have proposed algorithms which attempt to more closely estimate cell jitter statistics and derive timing recovery from those indications. These recursive approaches, suggested to be applicable to both synchronous and non-synchronous networks, rely upon the interaction of increasingly complex algorithms which would require the noted extensive controls for implementation.

Common to these prior service clock recovery proposals is the element of estimating the statistics of cell jitter in order to establish some basis for subsequent destination node clock control. Thus, whether applied in a synchronous network (identical source and destination node timing frequencies derived from the same clock) or a non-synchronous network (nominally identical source and destination timing frequencies derived from different clocks), any such practice continues to suffer from the uncontrollable and unpredictable variants which are the cause of cell jitter. The present invention, on the other hand, albeit primarily applicable in a synchronous network, eliminates entirely the factor of cell jitter and thereby reduces the problem of clock recovery to the simpler and readily accomplished one of resolving the substantially constant difference in frequency between the isochronous service clock and the network control clock.

SUMMARY OF THE INVENTION

In a synchronous broadband ATM network, such as the Synchronous Optical Network (SONET) prescribed by American National Standard, ANSI T1.105-1988, "Digital Hierarchy Optical Interface Rates and Formats Specification," 10 Mar. 1988, the network source and destination node control clocks are synchronized to the same timing reference. As a result, there is no necessity for relying upon any extraneous phenomenon such as instants of cell arrival to provide a datum base for determining the relative frequencies of those control clocks. The effect of cell jitter caused by multiplexing and switching delays in the network is therefore of little consequence in any procedure for circuit emulation which is based, as is the present invention, on an actual synchrony of node timing. Thus being devoid of concern for cell jitter, this process is free to simply determine the difference in frequency between the isochronous service signal input at the source node and the source/destination node timing clock(s).

In accordance with the present invention, this frequency difference between service and source node clocks is "encoded" during the process of packetizing the isochronous service signal into the cells to be transported through the ATM network, and the resulting "coded" information is carried by the individual cells to the destination node where it is used as the basis for establishing the frequency of a destination node clock which recovers the frequency of the source node input service signal. It would be well to note here that the concept of "encoding" is not used in these discussions in an absolute sense, rather it is employed in reference to the steps of the invention whereby occasional cells are flagged in a pseudo-"cell stuffing" procedure to provide an indication of the relative frequencies of the service and source node clocks.

The encoding procedure is accomplished in the packetization process at the source node by establishing a sufficiently high cell output rate that the equivalent bit rate will exceed the maximum isochronous service input rate, thereby ensuring the regular occurrence of an under-flow condition in the packet assembler FIFO buffer. Each time the buffer under-flow threshold, as determined by the prescribed cell payload size, is exceeded the cell assembler output is delayed for one cycle, thus generating a pseudo-"stuffed cell" or "cell gap", during which the buffer regains sufficiently to support further cell assembly. The first cell, or to provide greater robustness, the first few cells, output following this cell gap is flagged by setting the Cell Flagging Bit (CFB) located at a predesignated location in the cell information field. After transmission through the network, each such flagged cell arriving at the destination node will be indicative of the occurrence of an under-flow condition at the source node packet assembler, and the frequency of the appearances of flagged cells, not in real time, but with respect to the other cells in the transmission, will be representative of the difference between the frequencies of the service and source node clocks.

Recovery of the service clock frequency at the destination node may now proceed on the basis of this represented frequency difference, since due to the synchronous nature of the network such difference will be exactly the same as the difference between the service clock frequency and that of the destination node clock. According to the invention, such recovery begins with disassembly of the cells during which the CFBs of each cell are written into a CFB FIFO buffer from which they are read out at the frequency of the source assembler cell transmission, now derived from the synchronous destination node clock. The appearances of the set CFBs are then used to generate a stream of "Stuffed" Cell Indicator (SCI) signal pulses which match in realtime frequency the occurrences of the cell gaps created by the under-flow delays in cell output at the source node assembler. Finally, the service clock frequency is recovered by reducing the destination node control clock frequency in accordance with the SCI pulse frequency. This is accomplished by regularly inserting into the control clock stream, within the time span of each SCI pulse period, a number of gaps equal to the bit equivalent of the prescribed cell size, and smoothing the resulting clock signal in a phase-locked loop to remove the inserted gap jitter and obtain a steady clock frequency matching that of the original isochronous service clock.

To provide for the unlikely event in which the synchronous network suffers a loss of the true synchrony that is at the foundation of the present clock recovery system, the invention includes means for detecting and mediating this condition until the basic synchrony resumes. Such an asynchronous situation might arise as a result of a communication between two nodes which reside in respective network "islands" that are timed by independent stratum 1 clock sources. Although these sources are in substantial synchrony, within an accuracy of $1 \times 10^{-11}$, the absolute synchronization fundamental to SFET is not achieved. Such plesiochronous operation is readily remedied, however, by occasional destination clock adjustment in the system. Similar but more radical clock adjustment is employed where an asynchronous condition occurs in a truly synchronous network as a result, for example, of a failure in the means for deriving one of the source or destination control clocks from the master source. In this instance the number of gaps inserted into the destination node clock stream is revised according to an indication from the data buffer fill pointer in order to avoid loss of data, although at the expense of incurring some jitter.

In the foregoing manner, the present invention enables the recovery of an isochronous service clock frequency in an ATM network without any dependence upon the timing of cell arrivals at a network destination node. The problem of cell jitter inherent in previous clock recovery procedures is thereby avoided.

THE DRAWING

Figure 2:
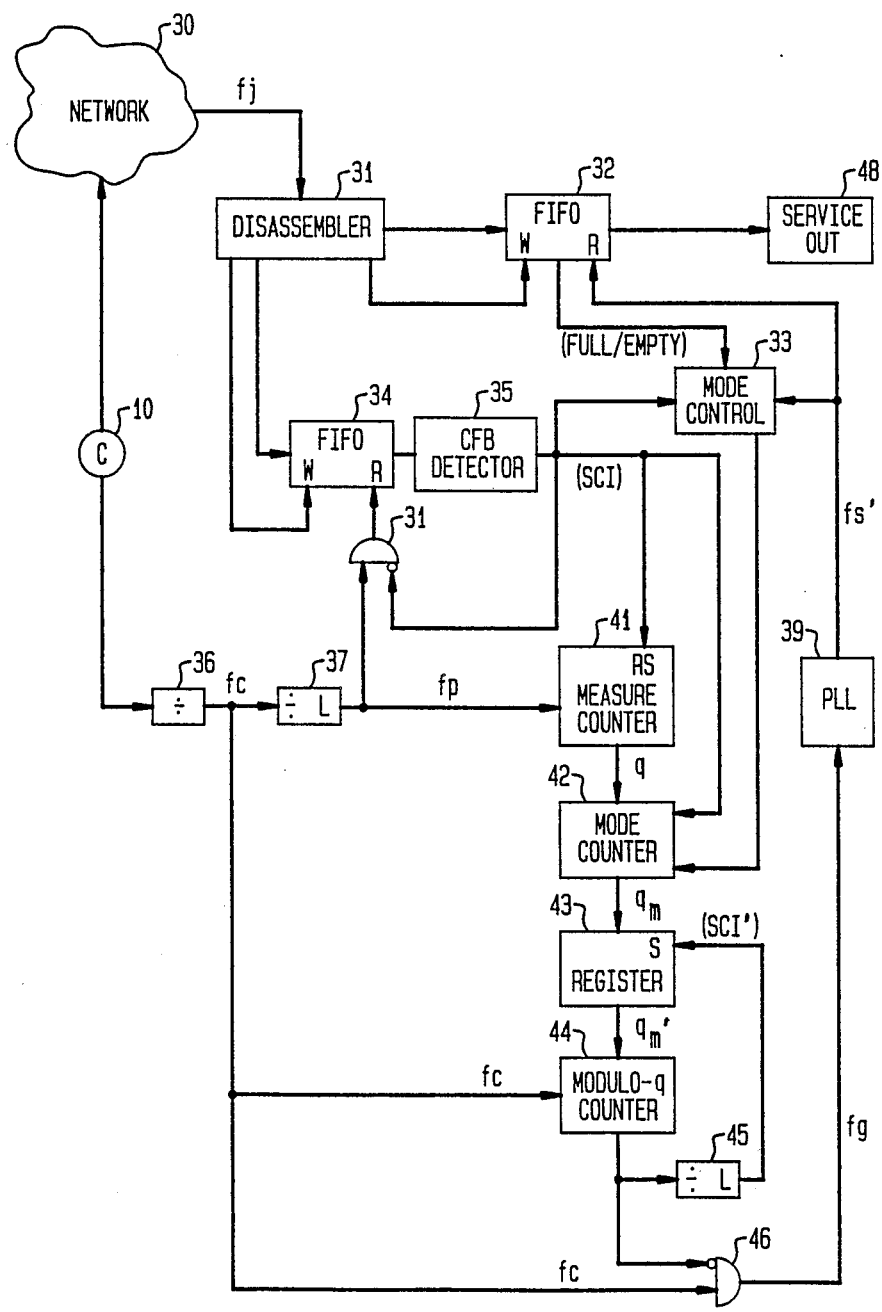
Figure 3:
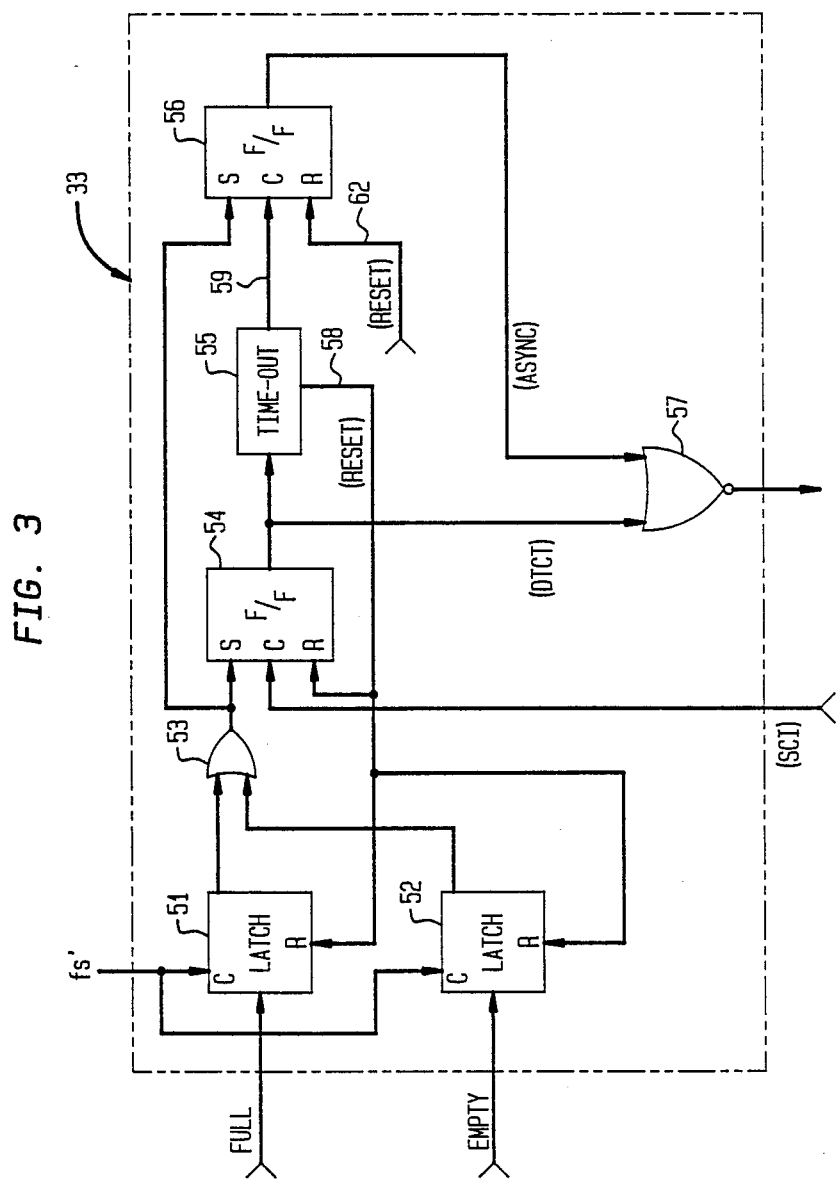

The present invention will be described with reference to the accompanying drawing of which:

FIG. 1 is a block diagram depicting a network source node subsystem for a preferred embodiment of the invention, FIG. 2 is a block diagram depicting a network destination node subsystem for such an embodiment of the invention, and FIG. 3 is a block diagram depicting an embodiment of a mode control element of the subsystem of FIG. 2.

DESCRIPTION OF THE INVENTION

Implementation of the present invention to recover an isochronous service signal after transmission through a broadband Asynchronous Transfer Mode (ATM) network entails modification of the normally employed packetizing protocol and selection of timing rates appropriate to the frequency of the service signal being transmitted. As shown in FIG. 1, this signal originates in the typical manner at a source 11 from which it is input to the system at a rate, $f_s$, which may be, for example, a DS1 or DS3 frequency. The bit stream of this isochronous service signal is written as usual into the cell assembler first-in first-out (FIFO) buffer 12 of a common packetizing system at the service input frequency rate. The manner in which these bits are read from FIFO 12 to assembler multiplexer 13 as cell information blocks, however, is established according to the following aspects of the invention.

In keeping with the normal packetizing protocol, delivery of each cell information block to multiplexer 13 is effected upon the activation of the read function of FIFO 12 by a signal from control 17 after a completed exchange of "request" and "grant" signals with ATM cell interface bus 14. Ordinarily, the "request" signal would be transmitted as soon as control 17 received an indication, by way of "buffer full" signal 19, that the prescribed complement of the standard number, L, of data bits had been accumulated in FIFO 12. According to the invention, however, an additional limitation is imposed upon this cell delivery procedure. Specifically, control 17 is constrained to transmit an otherwise appropriate "request" signal only upon receipt of a secondary timing signal having a frequency, $f_p$, which is a function of the prescribed cell size and which is derived in the following manner.

The basic network clock, C, shown at 10, which as previously noted serves as the reference for timing of all nodes of the synchronous network being here considered, is divided at the source node (FIG. 1), as in 15, to obtain a node control clock frequency, $f_c$, which is somewhat greater than service input frequency, $f_s$. Such division may be accomplished in any wellknown manner employing common dividing circuits in which a phase-locked loop may be utilized if the selected division factor is a rational number other than an integer. The secondary cell output clock, $f_p$, is then established by further dividing node clock frequency, $f_c$, by cell bit size, L, as at 16.

Under the influence of this cell output clock, $f_p$, control 17 is now enabled to transmit a "request" signal only on each $f_p$ time cycle, provided the primary requisite of a "buffer full" signal 19 has also been received. When operating with a sufficiently full buffer 12, the system will then regularly transmit a cell block of L information bits at each cycle of $f_p$, in effect transmitting such information bits from the buffer at an average rate of $f_c$. The difference, $\Delta f$, between clocking rates $f_s$ and $f_c$ at which the service data bits are respectively written into FIFO 12 and read out to multiplexer 13 will thus create a bit depletion, or under-flow, condition in this buffer 12 on a substantially regular basis which may vary somewhat according to normal variations in the service source frequency, $f_s$.

As will be apparent, this depletion of data bits in FIFO 12 will ultimately deprive control 17 of the necessary "buffer full" signal, thus disabling transmission of the next regular $f_p$ clocked "request" signal. In response to an $f_p$ clock signal while in this disabled condition, control 17 instead transmits a Cell Flagging Bit (CFB) signal to multiplexer 13 to set an indicator flag in the information field of a subsequent completed cell transmitted to network 30, thereby "encoding" in such cell the occurrence of a "cell gap", or pseudo-"stuffed cell", due to the depletion of data at FIFO 12.

Rather than depending upon an absolute data depletion in FIFO 12, it is preferred that a minimum threshold be utilized as a reference to signal an underflow condition. For this purpose, a preset threshold of somewhat less than one cell complement of L bits is established to provide for the noted disabling in control 17 whenever the FIFO 12 content is below this threshold on an $f_p$ clock cycle transition. During the ensuing $f_p$ clock period service data bits input at the $f_s$ rate will replenish the fill of FIFO 12 above the prescribed threshold with a resulting enabling of transmission of a "request" by control 17 at the next $f_p$ clock signal.

With the threshold thus regained in FIFO 12 and the disable condition removed, the regular output of cells at the $f_p$ rate may resume. The CFB condition at control 17 is likewise removed and subsequent cells will be transmitted to the network with unset indicator flags. As earlier suggested, a more robust flagging to ensure against error may be employed, for example by having control 17 cause multiplexer 13 to set the CFB flags in two or more cells following the single $f_p$ period cell output disable condition. In any event, the occurrence of each cell gap due to an underflow in FIFO 12 is "encoded" by a set flag indicator in at least one of the next ensuing transmitted cells.

In the foregoing manner, a timing-independent indication of the difference, $\Delta f$, between the service data input frequency, $f_s$, and the node clock frequency, $f_c$, is established. Since this rate, $\Delta f$, of bit under-flow in FIFO 12 directly determines the rate at which the cell threshold is exceeded, it may readily be seen that the rate of occurrence of disabled cell transmission, i.e. pseudo-"stuffed cell" gaps, bears the same ratio to the rate, $f_p$, of cell output as the under-flow rate, $\Delta f$, bears to the rate, $f_c$, of bit depletion at FIFO 12. The frequency with which flagged cells appear at the destination node of the network, vis-a-vis the total number of transmitted cells, thereby provides the "encoding" of the ratio, $\Delta f/f_c$ from which the original service input frequency, $f_s$, may be unerringly recovered ($f_s = f_c - \Delta f$) at the destination node.

FIG. 2 depicts a subsystem at the destination node of the synchronous network 30 by means of which the service frequency, $f_s$, may be recovered according to the present invention. As represented there, the transmitted cells arrive from network 30 at a frequency, $f_j$, which on average is equivalent to the rate, $f_p$, of cell output from the source node of FIG. 1, but which in actuality suffers the cell jitter irregularity resulting from the earlier-noted queuing and multiplexing delays within the network. The cell stream is directed to the usual cell disassembler 31 in which the cell information payload is separated from the cell header for subsequent utilization of the service data. These information bits are written directly to FIFO 32 as they are acquired to await reading at the reconstructed service frequency, $f_s'$, to a service signal bit stream output 48.

During cell disassembly, each CFB is written directly to FIFO 34 to be read out at the stable frequency, $f_p$, which is derived at the destination node from the same basic timing clock, C, utilized to generate cell output frequency, $f_p$, at the source node. Thus, in like manner, the basic clock 10 is divided at 36 to obtain the node control clock frequency, $f_c$, which is then further divided at 37 by the standard number of information bits, L, in each cell to obtain a clock of the same frequency, $f_p$, as the source node cell output clock. The CFB flagging bits of each cell are read from FIFO 34 at the $f_p$ rate to CFB detector 35 where each of the set flagging bits, or each group of such bits in the more robust signaling, now appearing at precisely the same frequency as they were set in multiplexer 13 (FIG. 1), is caused to generate a "Stuffed" Cell Indicator (SCI) pulse. Since the average rate of cell input to disassembler 31 from the network 30 is affected by the creation of cell gaps in multiplexer 13, it is necessary that the throughput of FIFO 34 be likewise affected. Therefore, to ensure that the average output rate of FIFO 34 matches that of its input from disassembler 31, the SCI pulse is applied to gate means 38 to inhibit the read function of FIFO 34 for one $f_p$ clock cycle. Under the control of this inhibited, or "gapped", $f_p$ timing, the SCI pulsing sequence now reproduces exactly the occurrences of cell output inhibition at multiplexer 13, and thus denotes the instances of FIFO 12 threshold under-flow.

With a common operating frequency, $f_p$, having been established at both the source and destination nodes of the network, the ratio of "stuffed" or "gapped" cells to regularly produced cells may be determined in measure counter 41 where the number, q, of $f_p$ clock periods counted between SCI reset pulses directly indicates such ratio as $1/q$. In order to preserve this count while the ratio is updated during the next SCI cycle to account for possible intermittent variations in original service frequency, $f_s$, the count, q, is read into mode counter 42 at each SCI pulse. While the system is in its predominant synchronous mode, of which more will be said later, counter 42, which may be a device such as the model 74269 8-bit counter marketed by Fairchild, simply serves as a holding register for each ratio count, q.

It is preferable that there be established at this point a timing for subsequent counting which is in phase with the $f_c$ node control clock. This may be accomplished by means of intermediate register 43 which is actuated by timing derived solely from this $f_c$ node control clock to latch through the count value, $q_m$ presented at the output of mode counter 42. The value, $q_m'$, which is output from register 43 in phase with the $f_c$ clock is then used to set modulo-q counter 44 whose count-down output when divided, as at 45, by the prescribed cell bit count, L, will provide a signal pulse stream which is of the same frequency as SCI and is in phase with node clock, $f_c$. This signal, SCI', is then used to latch each updated value, $q_m'$, through to modulo-q counter 44.

Recalling now that the cell gap ratio, $1/q$, is the same ratio as FIFO 12 bit depletion rate, $\Delta f/f_c$, one may reproduce the original service frequency ($f_s = f_c - \Delta f$) by introducing a bit gap in the $f_c$ bit stream at each $q_m'$ bits. This may be accomplished at gate means 46 where the output of modulo-q counter 44 is combined with node clock, $f_c$ to generate a "gapped" clock, $f_g$, which has the same average frequency as the isochronous service input clock, $f_s$. From this "gapped" clock the precise duplication, $f_s'$, of the service clock is established in phase-locked loop (PLL) 39 for use as the timing for isochronous service bit stream reading from FIFO 32 at the original input service signal frequency, now recovered as $f_s'$.

In the foregoing manner, the classic ATM network cell jitter is virtually eliminated from transmissions within a synchronous telecommunications network, such as the previously mentioned SONET which presents prospects for being a major carrier of broadband Integrated Services Digital Network (ISDN) traffic. Further, with the elimination of timing imperfections in circuit emulation according to the present invention, the additional types of jitter typical of previous ATM transmission on SONET, i.e. overhead and STS pointer movement jitter, are likewise no longer of consequence.

The described procedures of this emulation process do, however, introduce their own peculiar jitter, notably a "stuffed" cell jitter having a fundamental frequency substantially equal to $\Delta f$, and a very low frequency waiting time jitter that generally varies with $\Delta f$. Judicious selection of the control clock frequency, $f_c$, to establish a compromise $\Delta f$ within the range of a few hundred (400–900) Hz, primarily for DS1 (nominally at 1.544 Mb/s) emulation, enables substantially complete (to about 0.05 U.I.) attenuation of the higher frequency jitter in a PLL having a comfortably high cutoff frequency of about 100–200 Hz. Utilizing these parameters, the waiting time jitter is at the same time reduced to a level yielding an overall peak-to-peak output jitter of less than about 0.4 Unit Interval (U.I.). Emulation of a DS3 signal (nominally at 44.736 Mb/s), on the other hand, may be effected in such an arrangement with even more favorable jitter containment (to about 0.2 U.I. waiting time jitter with negligible high frequency jitter) by employing a $\Delta f$ in the range of about 1–20 KHz.

Further in the implementation of the present invention, consideration is given to the selection of the capacity of service data buffers of the system. In view of the various signaling delays within the usual packetizing protocol, as well as the requirement for retention of at least one L bit cell of service data, source node FIFO 12, for example, may preferably be sized to accommodate somewhat less than three such cells. Destination node buffer selection depends primarily on the maximum deviation of jittered cell arrivals from the mean cell delay. Considering that the maximum allowable jitter in any transmission system is fixed within prescribed bounds, it is foreseen that for relatively slow speed DS1 service, a buffer, such as FIFO 32, will be sufficient if retaining slightly more than two cells. For higher rate services, however, the greater bounds of the system will likely lead to a requirement for up to about a ten cell capacity in this buffer.

The description thus far has presumed the synchronous source and destination node clock timing upon which the present clock recovery system is predicated. Such a condition will normally be in effect; however, occasional interruptions in such synchronization cannot be entirely discounted. Of least concern, of course, are the instances in which the source and destination clocks come under the influence of separate Stratum I timing references that differ in frequency by not more than about $10^{-5}$ PPM. Although miniscule, this difference which exists in plesiochronous operation will eventually lead to a buffer under- or over-flow at the destination and cannot be ignored. Fortunately, a minor clock adjustment in the system on a regular basis would suffice to correct such a situation if, indeed, one were to occur. An error or failure in the generation of a local node clock, on the other hand, could result in a rapid disruption of the clock recovery system. For this reason means are provided for detecting any such error soon after it occurs and for initiating remedial action to preserve the service transmission.

As will be apparent, a loss of synchronization of the $f_c$ or $f_p$ clocks derived at the source and destination nodes will result in an immediate shift in the content level of data buffer 32 toward an under- or over-flow condition. In order to detect such a shift, minimum and maximum thresholds are set in FIFO 32 to provide respective signals when the fill pointer of this buffer reaches either of these indicators. In response to such a fill shift indication from FIFO 32, the clock recovery process earlier described is interrupted at mode counter 42 where, instead of being simply latched through from measure counter 41, the latest $f_p$ period count, $q$, is held and incremented or decremented for a short period of time according to the indicated direction of fill shift in order to obtain an decrease or increase in the frequency of recovered clock $f_s'$ which will counter the fill shift of FIFO 32. In the event that a plesiochronous condition had been responsible for the buffer fill "alarm", the short period of frequency adjustment during an initial detection state mode would suffice to move the fill pointer of FIFO 32 to well within the thresholds, and the synchronous state operation of the clock recovery system could be safely resumed.

If, however, the buffer flow imbalance had been the result of a failure of node clock synchronization, the short detection state adjustment would be insufficient to recover the balance at FIFO 32, and the threatened under- or over-flow condition would not be avoided. In this circumstance the system enters an asynchronous state mode in which the incremental adjustment of the $f_s'$ frequency is continued until the underlying clock failure is corrected and the the synchronization of the basic node clocks is resumed. Implementation of an embodiment of this mode selection and interim clock adjustment process may be seen with reference to FIGS. 2 and 3.

Mode control 33 (FIG. 2) which receives a "full" or "empty" threshold signal from FIFO 32 is depicted in greater detail in FIG. 3 and comprises latches 51, 52 which are actuated by a high-speed clock, such as $f_c$ or $f_s'$, to latch the respective buffer fill state signals to gate means 53 at the earliest instant that a threshold is exceeded. Thus, upon the appearance of either threshold "alarm" signal the output of gate 53 will so condition flip-flop (F/F) 54 and its output at the first occurrence of an SCI pulse from CFB detector 35 will establish the detection state (DTCT) at gate means 57. The resulting output state of gate 57 will then inhibit the latching function of mode counter 42, thereby causing it to retain the last measured, $q$, of $f_p$ clock periods. The output of F/F 54 at the same time also initiates a cycle of time-out circuit 55 which will continue for a predetermined time, for example 20–50 SCI periods for a DS1 data transmission, to thereby define the length of the detection state.

During the span of the detection state while counter 42 is inhibited from accepting updated measures of SCI periods from counter 41, SCI pulses directed to mode counter 42 increment or decrement the last acquired value of q, depending upon which of the "full" or "empty" signals was received in mode control 33. Revised values, $q_m$, are thus presented to register 43 and latched through in proper phase to modulo-q counter 44 as $q_m'$ to be employed as previously described in deriving an increased or decreased frequency gapped clock, $f_g$. The resulting adjusted service clock, $f_s'$, is then applied to counteract the shifting data fill in FIFO 32.

The adjustment of clock frequency in this manner for a DS1 service transmission effects a change of about 0.3 Hz with each SCI pulse. In the event of a plesiochronous condition, the resulting net frequency change during the detection state is usually sufficient to reset the fill pointer of FIFO 32 to well within the thresholds, thereby ensuring continued synchronous operation for a significant period of time. Such a recovered synchronous operating condition is confirmed in mode control 33 by a subsequent polling of the FIFO 32 fill level state at the end of the initial time-out period. At the conclusion of this period a signal output from circuit 55, as at 58, resets latches 51, 52 and F/F 54 to enable the current full/empty state of the FIFO 32 pointer to be latched through gate 53 to again condition the setting of F/Fs 54, 56. A second time-out signal, as at 59, slightly delayed from reset signal 58, actuates F/F 56 to output to gate 57 this pointer state indication. Thus if a synchronous state has been regained, neither latch 51 nor 52 would yield an active signal and the resulting null outputs of F/Fs 54, 56 to gate 57 would generate a signal enabling mode counter 42 to again latch through updated q values to register 43, and the SFET clock recovery process would be resumed.

With a synchronization failure, however, the minor clock adjustment attainable during the detection state period is inadequate to regain a balanced data flow through FIFO 32. The continued presence of a "full" or "empty" signal at F/F 56 of mode control 33 would therefore result in time-out signal 59 setting an asynchronous state (ASYNC) indication at gate 57. This condition and the inhibiting of mode counter 42 would thus persist with a resulting continuous shifting of the $f_s'$ clock frequency for as long a time as might be necessary for the synchronous state to be recovered. Since upon such recovery and while the synchronous state of the system is maintained there is no under- or over-flow at any of the FIFOs, the fill pointer of one of these buffer elements, for example the relatively slow running CFB FIFO 34, may be utilized to provide a signal to reset F/F 56, as at 62, and thus enable continued polling of the state of the system. The primary destination node service clock recovery process of the invention would then proceed without difficulty.

It is anticipated that other embodiments of the present invention will be apparent from the foregoing description to those of ordinary skill in the art, and such embodiments are likewise to be considered within the scope of the invention as set out in the appended claims.

What is claimed is:

1. A method of recovering at a destination node of a telecommunication network the timing clock of a service signal input at a source node of said network, which method comprises:
   (a) establishing source and destination node control clocks at respective frequencies different from that of said service signal timing clock;
   (b) encoding the difference ratio between the frequencies of said service signal timing clock and said source node control clock in packet cells transmitted between said source and destination nodes; and
   (c) altering in accordance with said difference ratio the frequency of the timing output from said destination node control clock.

2. A method according to claim 1 wherein said difference ratio encoding comprises cyclically setting a flag at a given bit location in at least one of said transmitted cells.

3. A method according to claim 1 wherein said source and destination control clocks are of different frequencies, which method further comprises:
   (a) providing at said destination node a service signal buffer having predetermined minimum and maximum fill level thresholds; and
   (b) further altering said frequency of timing upon the occurrence of an exceeded threshold by varying the magnitude of said frequency sufficiently to return the fill of said buffer to a level within said thresholds.

4. A method according to claim 1 wherein:
   (a) said source node control clock is established at a frequency greater by said difference ratio than that of said service signal timing clock; and
   (b) said altering of timing frequency from said destination clock is effected by regularly deleting clock pulses at a pulse rate equal to said difference ratio.

5. A method according to claim 4 wherein said source and destination node control clocks are established at identical frequencies derived from the same timing reference.

6. A method according to claim 5 wherein said difference ratio encoding comprises:
   (a) establishing a second source node clock at a frequency which is slower than said control clock frequency by a dividing factor equal to the fixed number of service data bits in each said packet cell;
   (b) assembling said cells at said service signal clock frequency;
   (c) transmitting said cells at said second clock frequency, thereby depleting at a rate equivalent to the difference between said source node control and service signal clock frequencies the service data bits available for assembly of said cells;
   (d) interrupting the transmission of said cells for at least one period of said second clock upon each depletion of service data bits; and
   (e) defining each cell transmission cycle by flagging at least one cell to be transmitted following resumption of said cell transmission.

7. A method according to claim 6 wherein said altering of timing frequency further comprises determining as said difference ratio the ratio of said at least one flagged cells to the total cells received at said destination node during a transmission cycle.

8. A method of recovering at a destination node of an ATM telecommunication network the timing clock of an isochronous service signal input at a source node of said network, which method comprises:
   (a) establishing at each of said source and destination nodes a first node control clock having a fixed timing relation to the basic timing source of said network, said first clock having a frequency greater than the frequency of said service input timing clock;

(b) establishing at each of said source and destination nodes a second node control clock having a fixed timing relation to said first node control clock, the frequency ratio of said first to said second clock being equal to the number of service information bits in a packet cell;

(c) accumulating the information bits of said service input in a source node packetizing means buffer at the frequency of said service input clock;

(d) transmitting cells from said packetizing means to said network at the frequency of said second control clock;

(e) monitoring the bit accumulation in said buffer with reference to a predesignated minimum threshold;

(f) disabling the transmission of at least one cell when said bit accumulation falls below said threshold;

(g) setting a cell flagging bit at a given location in at least one cell transmitted subsequent to said disabling;

(h) disassembling the transmitted cells received at said destination node;

(i) accumulating in a destination node buffer the cell flagging bits from said disassembled cells;

(j) examining the accumulated cell flagging bits seriatim at the frequency of said second control clock;

(k) providing a first signal upon each occurrence of said at least one set flagging bits;

(l) determining the number of periods of said second control clock between successive occurrences of said first signal;

(m) providing a second signal upon each completion of a like number of periods of said first control clock;

(n) inhibiting a timing stream from said first control clock for one period at each occurrence of said second signal, thereby deriving a gapped timing clock; and (o) smoothing said gapped timing clock to isochronous periods.

9. A method of recovering at a destination node of an ATM telecommunication network an isochronous service signal input at a source node of said network, which method comprises:

(a) recovering at said destination node according to the method of claim 8 the timing clock of said service signal;

(b) accumulating in a second destination node buffer the information bits from said disassembled cells; and (c) transferring said accumulated information bits from said second buffer seriatim at the frequency of said recovered service signal clock.

10. Apparatus for recovering at a destination node of a telecommunication network the timing clock of a service signal input at a source node of said network, which apparatus comprises:

(a) means for establishing source and destination node control clocks at respective frequencies different from that of said service signal timing clock;

(b) means for encoding the difference ratio between the frequencies of said service signal timing clock and said source node control clock in packet cells transmitted between said source and destination nodes; and (c) means for altering in accordance with said difference ratio the frequency of the timing output from said destination node control clock.

11. Apparatus according to claim 10 wherein said source and destination control clocks are of different frequencies, which apparatus further comprises:

(a) a service signal buffer at said destination node having predetermined minimum and maximum fill level thresholds; and (b) means for further altering said frequency of timing upon the occurrence of an exceeded threshold by varying the magnitude of said frequency sufficiently to return the fill of said buffer to a level within said thresholds.

12. Apparatus according to claim 10 wherein:

(a) said means for establishing node control clocks comprises means for establishing said source node control clock at a frequency greater by said difference ratio than that of said service signal timing clock; and (b) said timing frequency altering means comprises means for regularly deleting clock pulses at a pulse rate equal to said difference ratio.

13. Apparatus according to claim 12 wherein said means for establishing node control clocks comprises means for establishing said clocks at identical frequencies derived from the same timing reference.

14. Apparatus according to claim 13 wherein said difference ratio encoding means comprises:

(a) means for establishing a second source node clock at a frequency which is slower than said control clock frequency by a dividing factor equal to the fixed number of service data bits in each said packet cell;

(b) means for assembling said cells at said service signal clock frequency;

(c) means for transmitting said cells at said second clock frequency, thereby depleting at a rate equivalent to the difference between said source node control and service signal clock frequencies the service data bits available for assembly of said cells;

(d) means for interrupting the transmission of said cells for at least one period of said second clock upon each depletion of service data bits; and (e) means for defining each cell transmission cycle by flagging at least one cell to be transmitted following resumption of said cell transmission.

15. Apparatus according to claim 14 wherein said timing frequency altering means further comprises means for determining as said difference ratio the ratio of said at least one flagged cells to the total cells received at said destination node during a transmission cycle.

* * * * *